US012759032B1

(12) United States Patent
Matsumoto et al.

(10) Patent No.: US 12,759,032 B1
(45) Date of Patent: Oct. 13, 2026

(54) SYSTEM FOR ELECTRODE FOIL PRE-HEATING, AND METHODS THEREOF

(71) Applicant: Tesla, Inc., Austin, TX (US)

(72) Inventors: Matthew Thomas Matsumoto, Oakland, CA (US); Fahem Yahiaoui, Fremont, CA (US); Jack Krawczyk, Fremont, CA (US); Xin Chen, San Jose, CA (US); Daeyub Hwang, Fremont, CA (US); Jesus Rojas Gutierrez, Escondido, CA (US); Jin He, Fremont, CA (US)

(73) Assignee: Tesla, Inc., Austin, TX (US)

( * ) Notice: Subject to any disclaimer, the term of this patent is extended or adjusted under 35 U.S.C. 154(b) by 0 days.

(21) Appl. No.: 19/247,808

(22) Filed: Jun. 24, 2025

(51) Int. Cl.

| | |
|---|---|
| ***B21B 45/00*** | (2006.01) |
| ***B21B 27/06*** | (2006.01) |
| ***B21B 38/00*** | (2006.01) |
| ***B21B 45/02*** | (2006.01) |
| ***B21D 33/00*** | (2006.01) |
| ***B31D 5/00*** | (2017.01) |
| ***C25D 7/06*** | (2006.01) |

(52) U.S. Cl.
CPC ............ *B21B 45/004* (2013.01); *B21B 27/06* (2013.01); *B21B 38/006* (2013.01); *B21B 45/0233* (2013.01); *B21B 2265/12* (2013.01); *B21D 33/00* (2013.01); *B31D 5/00* (2013.01); *C25D 7/0614* (2013.01)

(58) Field of Classification Search
CPC .......... C25D 7/0614; C25D 7/06; C25D 7/00; B21B 45/004; B21B 45/00; B21B 27/06; B21B 27/00; B21B 38/006; B21B 38/00; B21B 2265/12; B21B 2265/00; B21B 45/0233; B21B 45/0215; B21B 45/0209; B21B 45/0203; B21B 45/02
USPC .................................................. 29/17.2, 17.1
See application file for complete search history.

(56) References Cited

U.S. PATENT DOCUMENTS 2,582,744 A * 1/1952 Brennan ................ H01G 9/048
428/595
3,549,505 A * 12/1970 Hanusa ................ B22F 3/1137
205/183
5,472,579 A * 12/1995 Mabuchi ................ B21B 45/06
205/714
5,964,904 A * 10/1999 Jin ........................ C22C 1/1094
29/17.2

(Continued)

*Primary Examiner* — Lawrence Averick
(74) *Attorney, Agent, or Firm* — Knobbe, Martens, Olson & Bear, LLP

(57) ABSTRACT

One or more aspects of the present disclosure relate to methods, systems, and devices related to a system for pre-heating an electrode foil, including a chimney and a heating device. The chimney formed between an inner surface of a heated wall and an inner surface of a passive wall, the chimney having a foil inlet at a first end and a foil outlet at a second end adjacent to a nip of a heated calender roll device. The heating device may be configured to heat the electrode foil and positioned adjacent to an outer surface of the heated wall, where the heating device includes a gas inlet, a heater and a nozzle adjacent to the foil outlet and in fluid communication with the heater, the nozzle including a bend configured to direct a flow of gas to the inner surface of the heated wall and towards the foil inlet.

15 Claims, 5 Drawing Sheets

(56) References Cited

U.S. PATENT DOCUMENTS

| | | | | |
|---|---|---|---|---|
| 6,193,780 | B1 * | 2/2001 | Cases Rocati | F23G 5/0273 29/17.2 |
| 6,582,586 | B1 * | 6/2003 | Akashi | B21B 45/06 205/714 |
| 7,102,877 | B2 * | 9/2006 | Mitchell | H01G 11/22 361/502 |
| 7,295,423 | B1 * | 11/2007 | Mitchell | H01G 9/00 361/502 |
| 7,920,371 | B2 * | 4/2011 | Mitchell | H01G 11/28 361/523 |
| 2005/0057888 | A1 * | 3/2005 | Mitchell | H01G 11/22 361/502 |
| 2006/0137158 | A1 * | 6/2006 | Zou | H01M 4/0416 252/511 |
| 2006/0147712 | A1 * | 7/2006 | Mitchell | H01G 11/28 427/180 |
| 2009/0290288 | A1 * | 11/2009 | Mitchell | H01M 4/0404 361/502 |
| 2010/0033901 | A1 * | 2/2010 | Mitchell | H01G 11/38 252/182.1 |
| 2024/0408657 | A1 * | 12/2024 | Maruo | H01M 4/0435 |
| 2025/0010348 | A1 * | 1/2025 | Su | B21B 45/0281 |
| 2025/0040000 | A1 * | 1/2025 | Hilgers | H05B 6/145 |

* cited by examiner

SYSTEM FOR ELECTRODE FOIL PRE-HEATING, AND METHODS THEREOF

BACKGROUND

Field

The present disclosure relates to devices, systems, and methods for forming an electrode. More specifically, the present disclosure relates to pre-heating an electrode foil prior to forming an electrode.

Description of the Related Art

Electrodes can be created using a wet or dry electrode manufacturing process. Conventional wet electrode processes involve mixing a slurry, coating a foil with the slurry, drying the slurry onto the foil, and subsequently a calendering process to form an electrode. Electrodes can also be created using a dry electrode process by calendering a dry electrode film onto a foil.

The calendering process to form the electrode can be prone to quality issues, such as introducing creasing, wrinkles, and wood grain into the foil of the electrode. Accordingly, there is a need for devices, systems, and methods for reducing quality issues during the production of electrodes.

SUMMARY

For purposes of summarizing the embodiments and the advantages achieved over the prior art, certain objects and advantages of the embodiments are described herein. Not all such objects or advantages may be achieved in any particular embodiment of the invention. Thus, for example, those skilled in the art will recognize that the design may be embodied or carried out in a manner that achieves or optimizes one advantage or group of advantages as taught herein without necessarily achieving other objects or advantages as may be taught or suggested herein.

In some aspects, a system for pre-heating an electrode foil is described. The system includes a chimney formed between an inner surface of a first wall and an inner surface of a second wall, the chimney including a foil inlet at a first end between the first wall and the second wall, and a foil outlet between the first wall and the second wall and at a second end adjacent to a nip including a first calendering roller and a second calendering roller of a heated calender roll device, the chimney configured such that the electrode foil can pass through the foil inlet and out the foil outlet, and a heating device configured to heat the electrode foil adjacent to the foil outlet to a temperature proximate the temperature of the first and second calendering rollers, wherein the heating device includes a gas inlet, a heater configured to heat gas from the gas inlet, and a nozzle adjacent to the foil outlet and in fluid communication with the heater, the nozzle including a bend configured to direct a flow of gas to the inner surface of the heated wall and towards the foil inlet, wherein the heating device is positioned such that the electrode foil passes from the foil outlet into the nip to create a strain-balanced foil.

In some aspects, a system for pre-heating an electrode foil is described. The system includes a chimney including a first wall, a second wall, a foil inlet at a first end between the first wall and the second wall, and a foil outlet at a second end between the first wall and the second wall, and a heating device adjacent to an outer surface of the first wall, wherein the heating device includes a gas inlet, a heater in fluid communication with the gas inlet, and a nozzle in fluid communication with the heater and the chimney, wherein the nozzle is adjacent to the foil outlet and is shaped to direct flow towards the foil inlet.

In some embodiments, the chimney is formed between an inner surface of the first wall and an inner surface of the second wall. In some embodiments, the heating device further comprises a temperature sensor positioned in the nozzle. In some embodiments, the heating device further includes a flow guide between the heater and the nozzle. In some embodiments, the foil inlet is positioned above the foil outlet. In some embodiments, the nozzle includes a bend configured to direct the flow of fluid towards the foil inlet. In some embodiments, the bend directs the flow from a downward direction to an upward direction. In some embodiments, an angle between the first wall and the second wall is between about 0 and about 5 degrees. In some embodiments, at least one of the first wall and the second wall are configured to pivot such that the angle is adjustable. In some embodiments, the system further includes a calender roll device including a pair of calendering rollers forming a calendering nip, wherein the nozzle is positioned adjacent to the calendering nip. In some embodiments, the nozzle is positioned above the calendering nip and the nozzle is configured to direct flow away from the calendering nip. In some embodiments, each calendering roller of the pair of calendering rollers includes a heated surface. In some embodiments, an end of the nozzle is positioned a distance less than 200 mm from the calendering nip. In some embodiments, the system further includes a first side seal positioned at a first edge of the nozzle and a second side seal positioned at a second edge of the nozzle, wherein the first side seal and the second side seal are orthogonal to the first wall and the second wall.

In some aspects, a method of pre-heating an electrode foil is described. The method includes moving the electrode foil in a first direction, heating a gas into a heated gas, moving the heated gas in the first direction, and redirecting the heated gas to contact the electrode foil and move in a second direction to form a pre-heated electrode foil.

In some embodiments, the method further includes calendering the pre-heated electrode foil with an electrode material in a calendering nip to form a strain-balanced electrode. In some embodiments, the method further includes pre-heating the electrode foil to a temperature higher than a temperature of the calendering nip. In some embodiments, the pre-heating the electrode foil includes pre-heating electrode foil to a temperature between 140 degrees C. and 230 degrees C. In some embodiments, the pre-heating the electrode foil includes pre-heating the electrode foil adjacent to the calendering nip. In some embodiments, the second direction is away from the calendering nip.

BRIEF DESCRIPTION OF THE DRAWINGS

The present embodiments are described with reference to the accompanying drawings, in which like reference characters reference like elements, and wherein.

DETAILED DESCRIPTION

Figure 1:
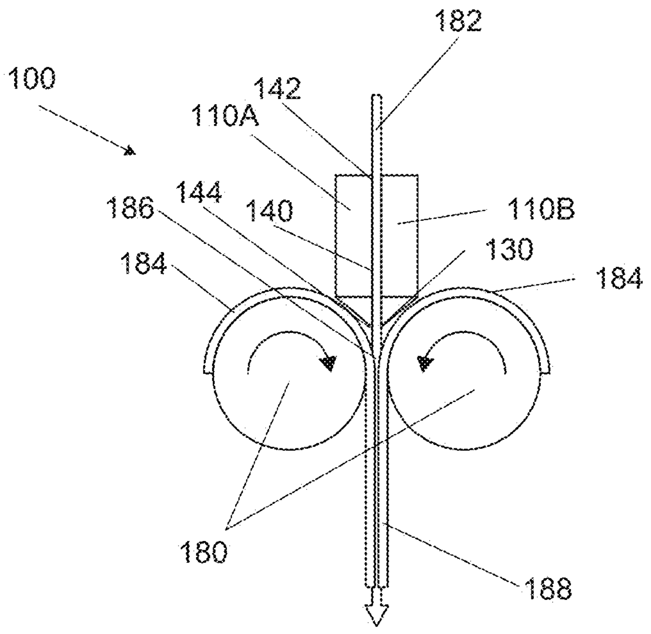
FIG. 1 is a schematic diagram illustrating a foil heating system, according to some embodiments.

The following detailed description of certain embodiments presents various descriptions of specific embodiments. However, the innovations described herein can be embodied in a multitude of different ways, for example, as defined and covered by the claims. In this description, reference is made to the drawings where like reference numerals and/or terms can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings. The headings are provided for convenience only and do not impact the scope or meaning of the claims.

Generally described, one or more aspects of the present disclosure relate to systems, methods, and devices for reducing the temperature differential between electrode foils and electrode films when laminating the electrode films onto the electrode foil, thereby reducing creasing and wood grain patterns (e.g., striations, linear inconsistencies, and/or textural differences) in the foil of the electrode. The system can be integrated into a calender rolling system and can create electrodes with reduced creasing and wood grain patterns. Advantageously, reducing creasing and wood grain patterns in an electrode can improve the shape and strength of the electrode.

Energy storage device electrodes may be manufactured from multilane electrodes. Multilane electrodes can include a foil layer (i.e., a current collector) coated with an electrode film material to form a plurality of coated lanes (i.e., portions of the foil layer covered by the electrode film material and/or ceramic material) and a plurality of bare lanes (i.e., exposed portions of the foil layer). In some embodiments, the multilane electrode may be a double-sided multilane electrode that includes coated lanes on both sides of the foil layer (e.g., the top and bottom). In the process of forming an electrode and/or a multilane electrode, the electrode film material and the foil layer passes through a nip between a pair of heated calendering rolls. In some embodiments, the pair of calendering rolls heat and compress the electrode film material onto the foil layer, thereby laminating the electrode film material onto the foil layer. The electrode film material is heated on the calendering rolls prior to entering a nip between the pair of calendering rolls. In conventional processes, the foil layer can enter the nip at substantially room temperature where the foil is rapidly heated during the lamination process through heated rollers, which causes the foil to expand. However, the foil can only or only substantially expand in the bare lanes. The foil cannot or cannot substantially expand in a cross-machine direction (e.g. widthwise). Therefore, the expansion in the foil causes the foil to bend, bow, and/or buckle out of its nominal plane, which results in crease and wrinkle defects in the foil.

Pre-heating the electrode foil prior to entering the nip can cause the foil layer to expand in a free state before the electrode film material is calendered onto the foil layer. Then, when the electrode foil subsequently passes through the nip, the expansion of the bare lanes is reduced or eliminated, forming a strain-balanced electrode. Because the bare lane expansion is reduced or eliminated, creasing and wood grain in the bare lanes and under the laminated film can be reduced in the strain-balanced electrode when compared to a multilane electrode calendered without a pre-heating step.

FIG. 1 is a diagram illustrating a heating system 100. The system 100 includes a first wall 110A, a second wall 110B, a chimney 140 formed between the first wall 110A and the second wall 110B, a foil inlet 142 at a first end between the first wall 110A and the second wall 110B, a foil outlet 144 at a second end between the first wall 110A and the second wall 110B, and a nozzle 130 towards the second end of the system 100. The first end is at the top of the system 100 and the second end is at the bottom of the system 100. The system 100 includes a pair of calendering rollers 180 positioned adjacent to each other. The calendering rollers 180 form a nip 186. The nip 186 is at the second end of the system 100. The nozzle 130 is above and adjacent to the nip 186.

An electrode foil 182 passes through the foil inlet 142 into the chimney 140 between the first wall 110A and the second wall 110B and out of the foil outlet 144. The nozzle 130 directs heat towards the electrode foil 182 adjacent to the foil outlet 144 and the nip 186. The nozzle 130 applies heat to the electrode foil 182 prior to the electrode foil 182 entering the nip 186. An electrode film material 184 is positioned on each calendering roller 180. The electrode film material 184 is laminated onto each side of the electrode foil 182 to form an electrode 188 at the nip 186. Each of the calendering rollers 180 are heated.

In some examples, the first wall can be a heated wall including a heater. In some examples, the second wall can be a heated wall including a heater. In some examples, one of the first wall or the second wall can be a passive wall which does not include a heater. In some examples, the nozzle provides heat to the electrode foil from the heater in the first wall. In some examples, the nozzle provides heat to the electrode foil from the heater in the second wall. In some examples, the nozzle provides heat to the electrode foil from the heater in the first wall and the heater in the second wall.

The heating system can be used to manufacture an electrode for an energy storage device. The system can pre-heat an electrode foil and the nip can calender the pre-heated electrode foil with the electrode material to form a strain-balanced electrode. Pre-heating the electrode foil can include heating the electrode foil to form a pre-heated electrode foil. In some examples, pre-heating the electrode foil can include pre-heating the electrode foil adjacent to the calendaring nip.

The electrode foil can be heated to a temperature similar to the temperature of the calendering rollers. For example, each of the calendering rollers can be heated to a temperature of approximately 200° C. and the nozzle can heat the electrode foil to a temperature of approximately 200° C. In some examples, the nozzle can heat the electrode foil to a temperature slightly higher than the temperature of the calendering rollers. Advantageously, heating the electrode foil to a temperature higher than the temperature of the calendering rollers allows for the electrode foil at the nip to have approximately the same temperature as the calendering rollers since the electrode film can be thin and lose heat quickly. In some embodiments, the temperature the electrode foil is heated to can be based on the temperature of the rollers, the ambient temperature, the speed of the rollers, the compression force of the nip, and/or the distance between the heater and the nip. Advantageously, biasing the temperature of the electrode foil as such may result in the electrode foil entering the nip having approximately the same temperature as the calendering rollers. Each of the calendering rollers can be heated to a temperature of, of about, of at least, or of at least about 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C. or any range of values therebetween in some examples. The nozzle can heat the electrode foil to a temperature of, of about, of at least, or of at least about 120° C., 125° C., 130° C., 135° C., 140° C., 145° C., 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C., 300° C. or any range of values therebetween in some examples.

Figure 2:
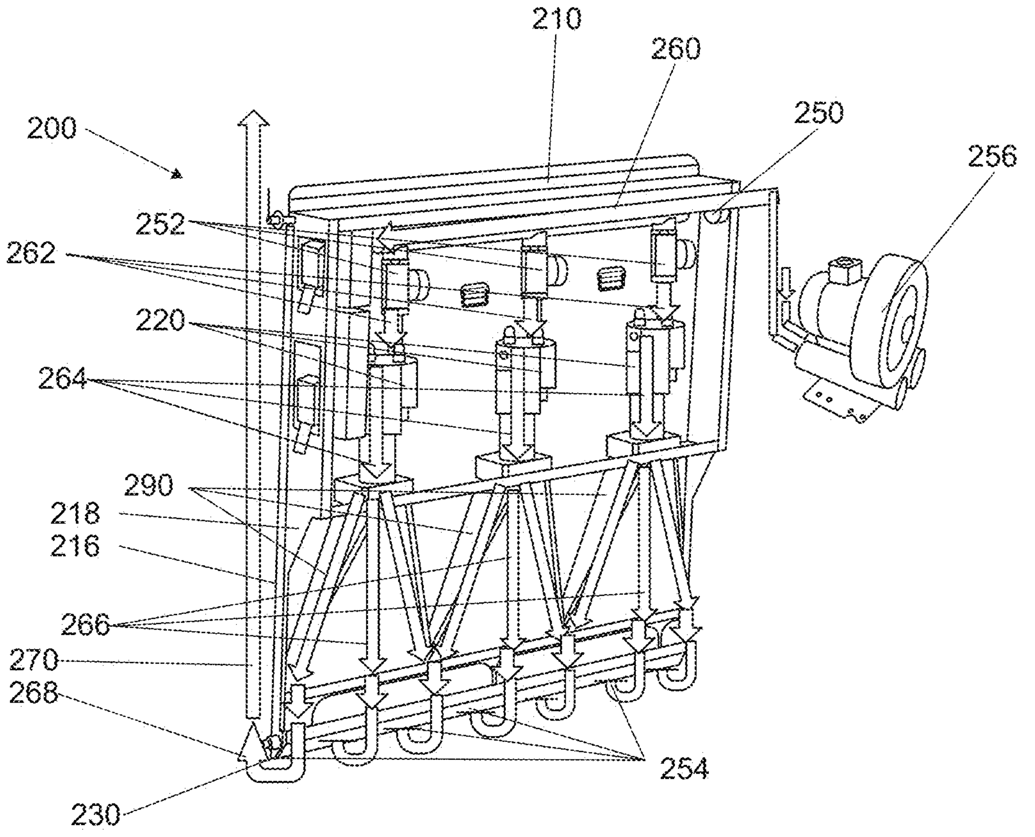
FIG. 2 is an illustration of a portion of a foil heating system, according to some embodiments.

FIG. 2 is a diagram illustrating a heating system 200 according to some embodiments. FIG. 2 shows a flow of air through the heating system 200. The heating system 200 includes a heated wall 210 which includes an air inlet 250, a plurality of flow valves 252, a plurality of heaters 220, a plurality of flow guides 290, a nozzle 230, and a plurality of temperature sensors 254. The heated wall 210 includes an inner surface 216 and an outer surface 218. The air inlet 250, the plurality of flow valves 252, the plurality of heaters 220, and the plurality of flow guides 290 are positioned adjacent to the outer surface 218 of the heated wall 210. The inlet 250 is in fluid communication with the plurality of flow valves 252. The plurality of flow valves 252 are in fluid communication with the plurality of heaters 220. The plurality of heaters 220 are in fluid communication with the plurality of flow guides 290. The plurality of flow guides 290 are in fluid communication with the nozzle 230. The inlet 250 is positioned at the top of the heated wall 210 and the nozzle 230 is positioned at the bottom of the heated wall 210. The plurality of temperature sensors 254 are positioned in the nozzle 230. The heated wall 210 extends the length of an electrode foil passing through the heating system 200.

A blower 256 sends air 260 into the inlet 250. A portion of the air 260 passes through each of the plurality of flow valves 252. The plurality of flow valves 252 balance the flow so that the air 260 is split evenly between each flow valve 252 to form a plurality of air streams 262. Each air stream 262 passes through one of the heaters 220. The heater 220 heats the air stream 262 to form a heated air stream 264. Each of the heated air streams 264 passes into one of the flow guides 290. The flow guide 290 can direct the heated air stream 264 to generate a hot laminar air flow 266 which spreads over a portion of the width of the heated wall 210. The hot laminar air flow 266 passes around the nozzle 130. The temperature sensors 254 sense the temperature of the hot laminar air flow 266. The nozzle 130 directs the hot laminar air flow 266 to form directed hot air 268. The directed hot air 268 flows through the nozzle 130 towards an end of the nozzle 130 and around to the inner surface 216 of the heated wall 210. On the inner surface 216 of the heated wall 210, an exiting air flow 270 is formed. The exiting air flow 270 moves upward along the inner surface 216 as it cools. The exiting air flow 270 rises via the exit velocity of the exiting air flow 270 from the nozzle and natural convection. The upward flow of the exiting air flow 270 causes low pressure and creates an upward draft. The upward flow of the exiting air flow 270 ensures that hot air does not move towards a nip below the heating system 200. The upward flow of the exiting air flow 270 advantageously ensures that the exiting air flow 270 can heat an electrode foil without heating the nip below the heating system 200.

In some examples, the plurality of heaters can be convective heaters. In some examples, the plurality of heaters can be electric fan heaters. In some examples, the system can include, or include about 1, 2, 3, 4, 5, 6, 7, 8 or more heaters, or any range therebetween. In some examples, each heater can supply heat at a rate of, of about, or of at least about 5 kW, 6 KW, 7 KW, 8 KW, 9 KW, 10 KW, 11 kW, 12 kW, 13 kW, 14 kW, 15 kW or any range therebetween.

In some examples, each flow guide includes a funneling shape which can extend outward from a nozzle of the heater to span a portion of the width of the heated wall. The flow guides can provide a substantially consistent air flow across the width of the heated wall adjacent to the nozzle. In addition, the flow guides can provide a flow having substantially the same temperature across the width of the heated wall adjacent to the nozzle.

The plurality of temperature sensors can be positioned on the inner surface of the heated wall. The plurality of temperature sensors can be positioned on the outer surface of the heated wall. The plurality of temperature sensors can be positioned below the nozzle. The plurality of temperature sensors can sense the temperature of the directed hot air from the nozzle. The plurality of temperature sensors can provide feedback to the heaters such that the temperature at the nozzle can be adjusted by increasing or decreasing the heater output. The plurality of temperature sensors can advantageously confirm the consistency of the temperature of the directed hot air across the width of the nozzle. The plurality of temperature sensors can be thermocouples, thermistors, or infrared sensors. In some examples, 1, 2, 3, 4, 5, 6, 7, 8, 9, 10 or more temperature sensors can be spaced across the width of the heated wall.

Figure 3:
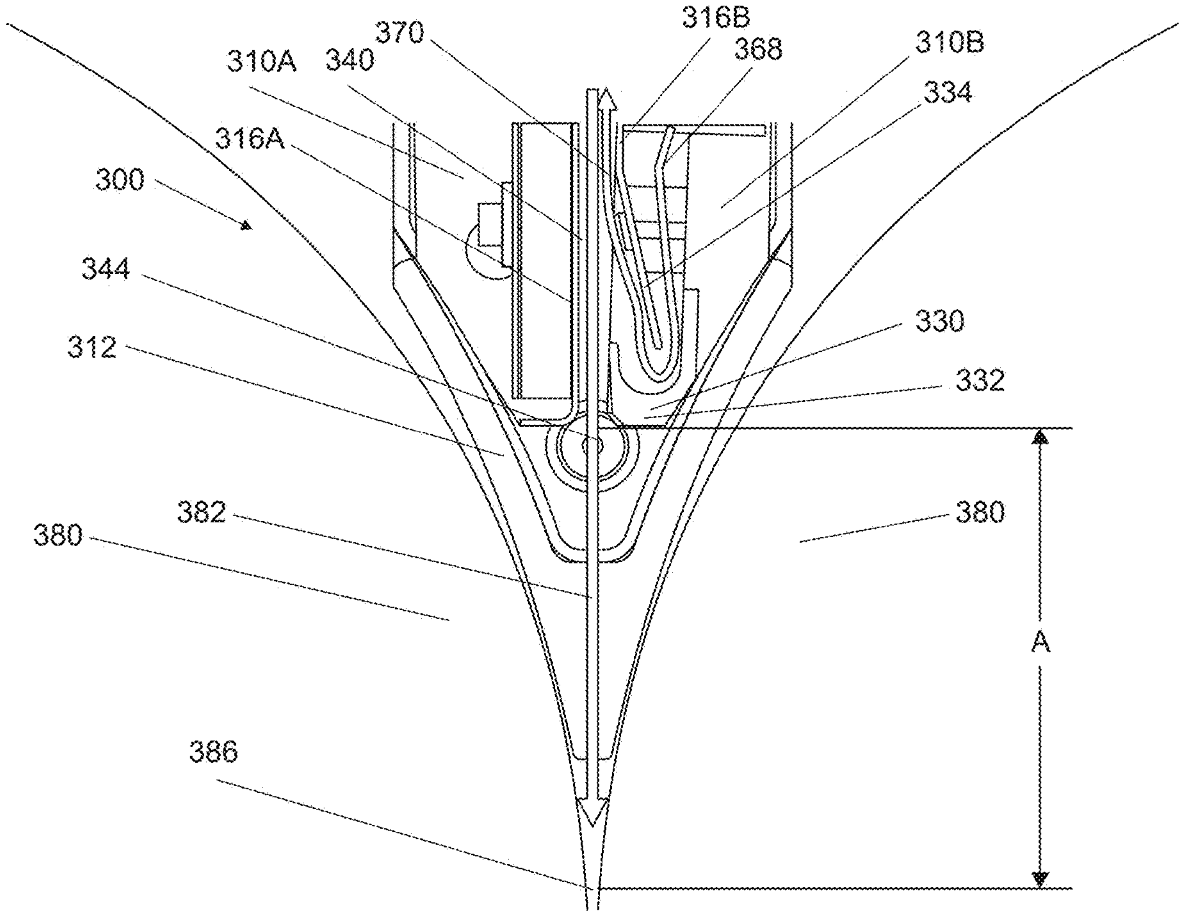
FIG. 3 is an illustration of a detailed side cross sectional view of a portion of a foil heating system, according to some embodiments.

FIG. 3 is an illustration of a detailed side cross sectional view of a portion of a heating system 300, according to some embodiments. The heating system 300 includes a passive wall 310A, a heated wall 310B, a chimney 340 having a foil outlet 344, and a side seal 312. The passive wall 310A includes an inner surface 316A. The heated wall 310B includes an inner surface 316B. The chimney 340 is formed between the inner surface 316B of the heated wall 310B and the inner surface 316A of the passive wall 310A. The side seal 312 is orthogonal to the passive wall 310A and the heated wall 310B.

The heated wall 310B includes a nozzle 330. The nozzle 330 includes a 180-degree bend that directs a flow of hot air 368 from a heater towards the foil outlet 344 then upward and away 370 from the foil outlet 344. The nozzle 330 includes a lower portion 332 and an upper portion 334. The lower portion 332 includes a bend which directs the flow of hot air 368. The bend is configured to direct the flow of the hot air 368 towards a foil inlet. The bend directs the flow from a downward direction (e.g., towards the foil outlet 344 to an upward direction (e.g., towards the foil inlet). The upper portion 334 includes an angled flange which extends toward the bend of the lower portion 332. The upper portion 334 directs the flow of hot air 368 towards the inner surface 316B of the heated wall 310B. The bend advantageously directs the flow of hot air such that an exiting air flow 370 rises via the exit velocity of the exiting air flow 370 from the nozzle natural convection. The upward flow of the exiting air flow 370 causes low pressure and creates an upward draft. The upward flow of the exiting air flow 370 ensures that exiting air flow 370 does not move towards a nip 386 below the heating system 300. The upward flow of the exiting air flow 370 advantageously ensures that the exiting air flow 370 can heat the electrode foil 382 without heating the nip 386.

An electrode foil 382 passes through the chimney 340 and exits the foil outlet 344. The heated wall 310B is positioned on a first side of the electrode foil 382. The passive wall 310A is positioned on a second side of the electrode foil 382. The nozzle 330 is positioned adjacent to a calendering nip 386 formed between a pair of calendering rollers 380. The end of the nozzle 330 is positioned a distance A from the nip 386.

The side seal 312 is positioned at an edge of the nozzle 330 so that the side seal 312 can insulate the heating system 300. The side seal 312 is positioned such that an edge of the electrode foil 382 is interior to the heating system 300. The side seal 312 insulates the heating system 300. The side seal 312 advantageously reduces any temperature drop in the electrode foil 382 between the nozzle 330 and the nip 386. A second side seal (not illustrated) can be positioned at the opposing edge of the nozzle 330 so that the second side seal can insulate the other side of the heating system 300. The second side seal is positioned such that an opposing edge of the electrode foil 382 is interior to the heating system 300. The second side seal advantageously reduces any temperature drop in the electrode foil 382 between the nozzle 330 and the nip 386.

In some examples, the distance A can be, be about, be at least, or be at least about 50 mm, 60 mm, 70 mm, 80 mm, 90 mm, 100 mm, 110 mm, 120 mm, 130 mm, 140 mm, 150 mm, 160 mm, 170 mm, 180 mm, 190 mm, 200 mm, 210 mm, 220 mm, 230 mm, 240 mm, or any range of values therebetween. The proximity of the nozzle to the nip, for example distance A, can advantageously reduce the amount of heat lost from the electrode foil between the nozzle and the nip. In some examples, the heating system can include a linear actuator which can lift the nozzle for maintenance. The linear actuator can lift the nozzle for example, about, at least, or at least about 80 mm, 90 mm, 100 mm, 110 mm, 120 mm, 130 mm, 140 mm, 150 mm, 160 mm, 170 mm, 180 mm, 190 mm, 200 mm, or any range of values therebetween. In some examples, both walls of the heating system can be lifted by the linear actuator for maintenance. The linear actuator can lift the walls for example, about, at least, or at least about 80 mm, 90 mm, 100 mm, 110 mm, 120 mm, 130 mm, 140 mm, 150 mm, 160 mm, 170 mm, 180 mm, 190 mm, 200 mm, or any range of values therebetween. In some embodiments, the bend angle of the nozzle can be about, at least, or at least about 160 degrees, 165 degrees, 170 degrees, 175 degrees, 180 degrees, 185 degrees, 190 degrees, 195 degrees, 200 degrees or any range of values therebetween in some examples.

The system 300 can perform a method of pre-heating an electrode foil. The method can include: moving the electrode foil 382 in a first direction, for example towards the foil outlet 344; heating a gas (e.g., air) into a heated gas (e.g., heated air); moving the heated gas (e.g., heated air) in the first direction, for example, towards the foil outlet 344, and redirecting the heated gas (e.g., heated air) to contact the electrode foil 382 and move in a second direction, for example away from the foil outlet 344 (e.g., away from the calendering nip 386), to form a pre-heated electrode foil. The method can include calendering the pre-heated electrode foil with an electrode material in the calendering nip 386 to form a strain-balanced electrode. The method can include pre-heating the electrode foil 382 to a temperature higher than a temperature of the calendering nip 386. The method can include pre-heating the electrode foil 382 adjacent to the calendering nip 386.

Figure 4A:
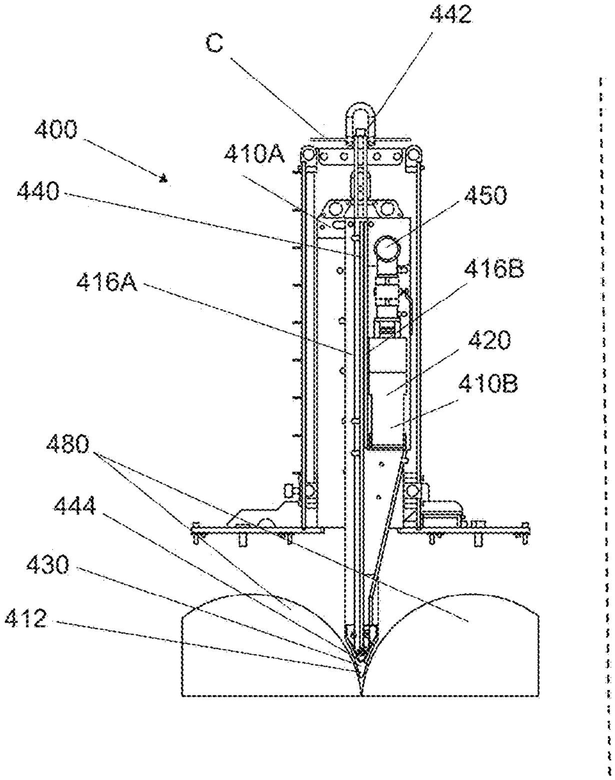
FIG. 4A is an illustration of a side cross sectional view of a portion of a foil heating system in a first positions, according to some embodiments.
Figure 4B:
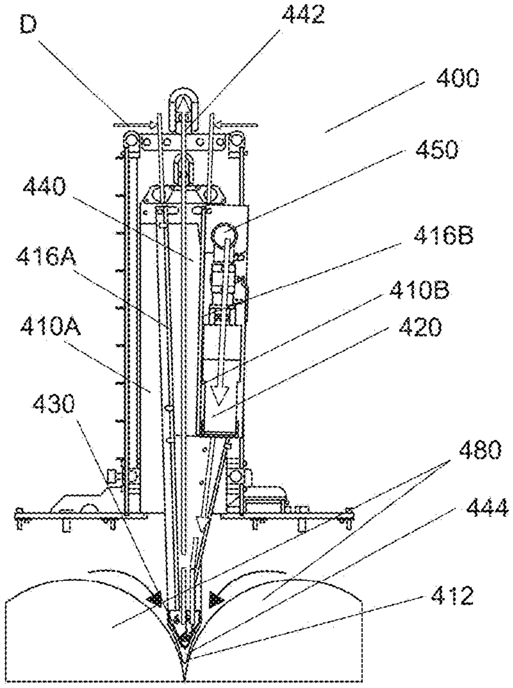
FIG. 4B is an illustration of a side cross sectional view of a portion of a foil heating system in a second positions, according to some embodiments.

FIGS. 4A and 4B illustrate a side cross sectional view of a portion of a heating system 400 in alternative positions, according to some embodiments. The heating system 400 includes a passive wall 410A, a heated wall 410B, a chimney 440, and a side seal 412. The heated wall 410B includes an air inlet 450, a heater 420, and a nozzle 430 which can include any of the features described above with regard to FIGS. 1-3. The passive wall 410A includes an inner surface 416A. The heated wall 410B includes an inner surface 416B. The chimney 440 is formed between the inner surface 416B of the heated wall 410B and the inner surface 416A of the passive wall 410A. The chimney 440 can include a foil inlet 442 positioned at the top of the foil heating system 400. The chimney 440 can include a foil outlet 444 positioned at the bottom of the foil heating system 400.

In FIG. 4A, the inner surface 416A of the passive wall 410A and the inner surface 416B of the heated wall 410B are in a first position having an angle C between them. The angle C is about 0 degrees. In FIG. 4B, the inner surface 416A of the passive wall 410A and the inner surface 416B of the heated wall 410B are in a first position having an angle D between them. The angle D is about 4 degrees. The passive wall 410A and the heated wall 410B each pivot such that the angle between the inner surfaces 416A, 416B of the walls 410A, 410B is adjustable. The passive wall 410A and the heated wall 410B each pivot so that the angle between the inner surface 416A and the inner surface 416B can be any value between angle C and angle D.

The angles C and D can advantageously be adjusted. In some examples, the angles C and D can be adjusted depending on ambient temperature, the temperature of the hot air, and/or the temperature of the exiting air flow. By adjusting the angles C and D, the convection of the hot exiting air flow upward can be improved. The improved convection of the hot exiting air flow can advantageously ensure that the hot exiting air flow does not impact the temperature of the calendering rolls below the chimney.

In some examples, the angle C can be, be about, be at most, or be at most about 0 degrees, 0.1 degrees, 0.2 degrees, 0.3 degrees, 0.4 degrees, 0.5 degrees, 0.6 degrees, 0.7 degrees, 0.8 degrees, 0.9 degrees, 1.0 degrees, 1.1 degrees, 1.2 degrees, 1.3 degrees, 1.4 degrees, 1.5 degrees, 1.6 degrees, 1.7 degrees, 1.8 degrees, 1.9 degrees, 2.0 degrees, 2.1 degrees, 2.2 degrees, 2.3 degrees, 2.4 degrees, 2.5 degrees, 2.6 degrees, 2.7 degrees, 2.8 degrees, 2.9 degrees, 3.0 degrees, 3.1 degrees, 3.2 degrees, 3.3 degrees, 3.4 degrees, 3.5 degrees, 3.6 degrees, 3.7 degrees, 3.8 degrees, 3.9 degrees, 4.0 degrees, or any range of values therebetween. In some examples, the angle D can be, be about, be at least, or be at least about 2.0 degrees, 2.1 degrees, 2.2 degrees, 2.3 degrees, 2.4 degrees, 2.5 degrees, 2.6 degrees, 2.7 degrees, 2.8 degrees, 2.9 degrees, 3.0 degrees, 3.1 degrees, 3.2 degrees, 3.3 degrees, 3.4 degrees, 3.5 degrees, 3.6 degrees, 3.7 degrees, 3.8 degrees, 3.9 degrees, 4.0 degrees, 4.1 degrees, 4.2 degrees, 4.3 degrees, 4.4 degrees, 4.5 degrees, 4.6 degrees, 4.7 degrees, 4.8 degrees, 4.9 degrees, 5.0 degrees, 5.1 degrees, 5.2 degrees, 5.3 degrees, 5.4 degrees, 5.5 degrees, 5.6 degrees, 5.7 degrees, 5.8 degrees, 5.9 degrees, 6.0 degrees, 6.1 degrees, 6.2 degrees, 6.3 degrees, 6.4 degrees, 6.5 degrees, 6.6 degrees, 6.7 degrees, 6.8 degrees, 6.9 degrees, 7.0 degrees, or any range of values therebetween.

Electrode Materials, Electrode Films, Electrodes and Energy Storage Devices

An active material (e.g., cathode active material, anode active material) may be used in the preparation of an electrode film and/or electrode for an energy storage device. In some embodiments, an electrode comprises a foil (i.e., a current collector) and an electrode film (i.e., coated lane).

In some embodiments, the active material is a cathode active material. In some embodiments, the cathode active material is selected from at least one of a metal oxide, metal sulfide, a sulfur-carbon composite, a lithium metal oxide, and a material including sulfur. In some embodiments, the cathode active material is selected from lithium iron phosphate (i.e., $LiFePO_4$ or "LFP"), lithium manganese iron phosphate (e.g., $LiMn_{0.6}Fe_{0.4}PO_4$ or "LMFP"), lithium nickel manganese cobalt oxide (i.e., $LiNi_xMn_yCo_{1-x-y}O_2$ or "NMC"), lithium nickel cobalt aluminum oxide (i.e., $LiNi_xCo_yAl_2O_2$ or "NCA"), lithium manganese oxide ("LMO"), lithium nickel manganese oxide ("LNMO"), lithium cobalt oxide ("LCO"), lithium titanate ("LTO"), or combinations thereof. In some embodiments, the cathode active material includes at least two of LFP, LMFP, NMC, NCA, LMO, LNMO, LCO, LTO, and combinations thereof. In some embodiments, the cathode active material is an iron phosphate-based active material. In some embodiments, iron phosphate-based active materials include $LiFePO_4$ (i.e., "lithium iron phosphate" and "LFP") and $LiMn_{1-x}Fe_xPO_4$ (i.e., "lithium manganese iron phosphate" and "LMFP") (e.g., $LiMn_{0.6}Fe_{0.4}PO_4$ or $LiMn_{0.8}Fe_{0.2}PO_4$). In some embodiments, the iron phosphate-based active material includes LFP. In some embodiments, the iron phosphate-based active material includes an LMFP. In some embodiments, the iron phosphate-based active material includes an LFP and/or an LMFP.

In some embodiments, the active material is an anode active material. In some embodiments, anode active materials can include, for example, an insertion material (such as carbon, graphite, and/or graphene), an alloying/dealloying material (such as silicon, silicon oxide, tin, and/or tin oxide), a metal alloy or compound (such as Si—Al, and/or Si—Sn), and/or a conversion material (such as manganese oxide, molybdenum oxide, nickel oxide, and/or copper oxide). The anode active materials can be used alone or mixed together to form multi-phase materials (such as Si—C, Sn—C, SiOx-C, SnOx-C, Si—Sn, Si—SiOx, Sn—SnOx, Si—SiOx-C, Sn—SnOx-C, Si—Sn—C, SiOx-SnOx-C, Si—SiOx-Sn, or Sn—SiOx-SnOx.). Anode active materials include common natural graphite, synthetic or artificial graphite, surface modified graphite, spherical-shaped graphite, flake-shaped graphite and blends or combinations of these types of graphite, metallic elements and its compound as well as metal-C composite for anode.

In some embodiments, the electrode film comprises the active material in an amount of, of about, of at least, or at least about, 70 wt. %, 75 wt. %, 80 wt. %, 85 wt. %, 86 wt. %, 87 wt. %, 88 wt. %, 89 wt. %, 90 wt. %, 91 wt. %, 92 wt. %, 93 wt. %, 94 wt. %, 95 wt. %, 96 wt. %, 97 wt. %, 98 wt. %, 98.5 wt. %, 99 wt. %, 99.5 wt. %, 99.8 wt. % or 99.9 wt. %, or any range of values therebetween.

In some embodiments, an electrode film comprises a carbon material configured to reversibly intercalate lithium ions. In some embodiments, the lithium intercalating carbon is selected from a graphitic carbon, graphite, hard carbon, soft carbon and combinations thereof. For example, the electrode film of the electrode can include a binder material, one or more of graphitic carbon, graphite, graphene-containing carbon, hard carbon and soft carbon, and an electrical conductivity promoting material. In some embodiments, an electrode is mixed with lithium metal and/or lithium ions. In some embodiments, the electrode comprises the carbon material in a total amount of, of about, of at most, or at most about, 20 wt. %, 15 wt. %, 10 wt. %, 9 wt. %, 8 wt. %, 7 wt. %, 6 wt. %, 5 wt. %, 4 wt. %, 3 wt. %, 2 wt. %, 1 wt. %, or any range of values therebetween.

In some embodiments, an electrode film includes a conductive additive. In some embodiments, the conductive additive may comprise a conductive carbon additive, such as a carbon black. In some embodiments, the conductive additive may comprise a conductive carbon additive. In some embodiments, the conductive carbon additive comprises carbon black, carbon nanotubes, such as single-walled carbon nanotubes (SWCNTs) and multi-walled carbon nanotubes (MWCNTs). In some embodiments, the electrode film comprises the conductive additive in a total amount of, of about, of at most, or at most about, 10 wt. %, 9 wt. %, 8 wt. %, 7 wt. %, 6 wt. %, 5 wt. %, 4 wt. %, 3 wt. %, 2 wt. %, 1 wt. %, 0.5 wt. %, 0.25 wt. %, 0.1 wt. %, or any range of values therebetween. In some embodiments, each of the conductive additive is in an amount of, of about, of at most, or at most about, 10 wt. %, 9 wt. %, 8 wt. %, 7 wt. %, 6 wt. %, 5 wt. %, 4 wt. %, 3 wt. %, 2 wt. %, 1 wt. %, 0.5 wt. %, 0.25 wt. %, 0.1 wt. %, of the electrode film, or any range of values therebetween. In some embodiments, the conductive additive is carbon black.

In some embodiments, the electrode film includes a binder. In some embodiments, binders can include polytetrafluoroethylene (PTFE), a polyolefin, polyalkylenes, polyethers, styrene-butadiene, co-polymers of polysiloxanes and polysiloxane, branched polyethers, polyvinylethers, a carboxymethylcellulose (CMC), co-polymers thereof, and/or combinations thereof. In some embodiments, the polyolefin can include polyethylene (PE), polypropylene (PP), polyvinylidene fluoride (PVDF), co-polymers thereof, and/or combinations thereof. For example, the binder can include polyvinylene chloride, poly(phenylene oxide) (PPO), polyethylene-block-poly(ethylene glycol), poly(ethylene oxide) (PEO), poly(phenylene oxide) (PPO), polyethylene-block-poly(ethylene glycol), polydimethylsiloxane (PDMS), polydimethylsiloxane-coalkylmethylsiloxane, copolymers thereof, and/or combinations thereof. In some embodiments, the binder may include a thermoplastic. In some embodiments, the binder comprises a fibrillizable and/or fibrillized polymer. In certain embodiments, the binder comprises, consists essentially, or consists of a single fibrillizable and/or fibrillized binder, such as PTFE. In some embodiments, the electrode film includes, includes about, includes at most, or includes at most about, 1 wt. %, 2 wt. %, 3 wt. %, 4 wt. %, 5 wt. %, 6 wt. %, 7 wt. %, 8 wt. %, 9 wt. %, 10 wt. %, or any range of values therebetween, of a binder.

In some embodiments, the electrode film can be a wet processed electrode film. In some embodiments, the electrode film is prepared by a wet or slurry-based electrode fabrication process. In some embodiments, the electrode film of the present disclosure can be a dry processed electrode film. In some embodiments, the electrode film is prepared by a dry electrode fabrication process. As used herein, a dry electrode fabrication process can refer to a process in which no or substantially no solvents are used to form a dry electrode film. For example, components of the active layer or electrode film, including carbon materials and binders, may comprise, consist of, or consist essentially of dry particles. The dry particles for forming the active layer or electrode film may be combined to provide a dry particle active layer mixture. In some embodiments, the active layer or electrode film may be formed from the dry particle active layer mixture such that weight percentages of the components of the active layer or electrode film and weight percentages of the components of the dry particles active layer mixture are substantially the same. In some embodiments, the active layer or electrode film formed from the dry particle active layer mixture using the dry fabrication process may be free from, or substantially free from, any processing additives such as solvents and solvent residues resulting therefrom. In some embodiments, the resulting active layer or electrode films are self-supporting films formed using the dry process from the dry particle mixture. In some embodiments, the resulting active layer or electrode films are free-standing films formed using the dry process from the dry particle mixture. A process for forming an active layer or electrode film can include fibrillizing the fibrillizable binder component(s) such that the film comprises fibrillized binder. In further embodiments, a free-standing active layer or electrode film may be formed in the absence of a foil. In still further embodiments, an active layer or electrode film may comprise a fibrillized polymer matrix such that the film is self-supporting. It is thought that a matrix, lattice, or web of fibrils can be formed to provide mechanical structure to the electrode film.

In some embodiments, an electrode film is disposed on a foil (e.g., a coated lane is disposed on a foil layer) to form an electrode. In some embodiments, a foil can include a metallic material, such as a material comprising aluminum, nickel, copper, combinations of the foregoing. In some embodiments, a foil comprises a pure metal. In some embodiments, a foil comprises a metallized polymer film or metal coated polymer film. In some embodiments, the polymer comprises polyethylene terephthalate (PET), biaxially oriented polypropylene (BOPP) or a combination thereof. In some embodiments, the metal coating comprises aluminum. In some embodiments, coating the final electrode film mixture comprises forming a uniform electrode film mixture coating. In some embodiments, the foil comprises a thickness of, of about, of at most, or at most about, 200 μm, 100 μm, 50 μm, 40 μm, 30 μm, 20 μm, 15 μm, 10 μm, 5 μm, or any range of values therebetween.

In some embodiments, an electrode is a double-sided electrode. In some embodiments, the double-sided electrode includes two electrode films. In some embodiments, the double-sided electrode may include a foil, a top electrode film, and a bottom electrode film. In some embodiments, each of the two electrode films can have any suitable shape, size and thickness.

In some embodiments, an energy storage device comprises a separator, an anode electrode, the cathode electrode, an electrolyte, and a housing, wherein the electrolyte, separator, anode electrode and cathode electrode are disposed within the housing and the separator is positioned between the anode and cathode electrodes. In some embodiments, an energy storage device is formed by placing an electrolyte, a separator, an anode electrode and the cathode electrode described herein within a housing, wherein the separator is placed between the anode electrode and the cathode electrode.

An electrode assembly includes a cathode, an anode, and a separator positioned between the anode and cathode. In some embodiments, the electrode assembly is a wound electrode (i.e., rolled electrode) assembly (e.g., a jelly roll). In some embodiments, the energy storage device is selected from the group consisting of a cylindrical energy storage device, a stacked prismatic energy storage device, and a spiral-wound prismatic energy storage device.

The electrode disclosed herein may be used for an energy storage device. In some embodiments, the energy storage device comprises a separator, an anode electrode, the cathode electrode, an electrolyte, and a housing, wherein the electrolyte, separator, anode electrode and cathode electrode are disposed within the housing and the separator is positioned between the anode and cathode electrodes. In some embodiments, an energy storage device is formed by placing an electrolyte, a separator, an anode electrode and the cathode electrode described herein within a housing, wherein the separator is placed between the anode electrode and the cathode electrode. In some embodiments, the energy storage device comprises an anode electrode positioned between two cathode electrodes. In some embodiments, the anode electrode and/or the cathode electrode comprises a shaped electrode film. In some embodiments, the energy storage device is a lithium-ion battery. In some embodiments, the energy storage devices may be a battery, capacitor, capacitor-battery hybrid, fuel cell, or combinations thereof. In some embodiments, the energy storage system or energy storage device may be used for electromobility. In some embodiments, the energy storage device may be used in motor vehicles, including hybrid electric vehicles (HEV), plug-in hybrid electric vehicles (PHEV), and/or electric vehicles (EV). In some embodiments, the energy storage device used in motor vehicles, including hybrid electric vehicles (HEV), plug-in hybrid electric vehicles (PHEV), and/or electric vehicles (EV) reduces greenhouse gas emissions.

In some embodiments, the energy storage device is charged with a suitable lithium-containing electrolyte. For example, the energy storage device can include a lithium salt, and a solvent, such as a non-aqueous or organic solvent. Generally, the lithium salt includes an anion that is redox stable. In some embodiments, the anion can be monovalent. In some embodiments, a lithium salt can be selected from lithium hexafluorophosphate ($LiPF_6$), lithium bis(trifluoromethanesulfonyl)imide (LiFSI), lithium tetrafluoroborate ($LiBF_4$), lithium perchlorate ($LiClO_4$), lithium bis(trifluoromethansulfonyl)imide ($LiN(SO_2CF_3)_2$), lithium trifluoromethansulfonate ($LiSO_3CF_3$), lithium bis(oxalato) borate ($LiB(C_2O_4)_2$), lithium bis(fluorosulfonyl)imide ($LiN(SO_2F)_2$, lithium difluoro (oxalato) borate ($LiC_2BF_2O_4$) and combinations thereof. In some embodiments, the electrolyte can include a quaternary ammonium cation and an anion selected from the group consisting of hexafluorophosphate, tetrafluoroborate and iodide. In some embodiments, the salt concentration can be about 0.1 mol/L (M) to about 5 M, about 0.2 M to about 3 M, or about 0.3 M to about 2 M. In further embodiments, the salt concentration of the electrolyte can be about 0.7 M to about 2 M. In certain embodiments, the salt concentration of the electrolyte can be about 0.2 M, about 0.3 M, about 0.4 M, about 0.5 M, about 0.6 M, about 0.7 M, about 0.8 M, about 0.9 M, about 1 M, about 1.1 M, about 1.2 M, 1.3M, 1.4M, 1.5M or values therebetween.

In some embodiments, an energy storage device can include a liquid solvent. The solvent need not dissolve every component, and need not completely dissolve any component, of the electrolyte. In further embodiments, the solvent can be an organic solvent. In some embodiments, a solvent can include one or more functional groups selected from dioxathiolane (e.g., 1,3,2-dioxathiolane-2,2-dioxide (i.e., "DTD")), carbonates, ethers and/or esters. In some embodiments, the solvent can comprise a carbonate. In further embodiments, the carbonate can be selected from cyclic carbonates such as, for example, ethylene carbonate (EC), propylene carbonate (PC), vinyl ethylene carbonate (VEC), vinylene carbonate (VC), fluoroethylene carbonate (FEC), and combinations thereof, or acyclic carbonates such as, for example, dimethyl carbonate (DMC), diethyl carbonate (DEC), ethyl methyl carbonate (EMC), 1,3-propene sultone (PRS), and combinations thereof. In some embodiments, the solvent can comprise an ester. In some embodiments, the ester is selected from methyl acetate (MA), methyl propionate (MP), ethyl acetate (EA), methyl butyrate (MB), and combinations thereof. In some embodiments, the solvent may include EC, PC, VEC, VC, FEC, DMC, DEC, EMC, MA, MP, EA, MB, and combinations thereof. In some embodiments, the solvent may include EC, DMC, DEC, EMC, MA, and combinations thereof. In some embodiments, the solvent may include EC, DMC, EMC, and combinations thereof. In some embodiments, the solvent may include a ratio of EC:DMC:EMC of 10-30:0-90:0-70.

In some embodiments, one or more solvents can be used at a concentration of, of about, of at least, or at least about, 30 wt. %, 35 wt. %, 40 wt. %, 45 wt. %, 50 wt. %, 55 wt. %, 60 wt. %, 65 wt. %, 70 wt. %, 75 wt. %, 80 wt. %, 85 wt. % or 90 wt. %, or any range of values therebetween. In some embodiments, solvents are utilized as additives in the electrolyte system, and can be used at a concentration of, of about, of at most, or at most about, 0.1 wt. %, 0.2 wt. %, 0.3 wt. %, 0.4 wt. %, 0.5 wt. %, 0.6 wt. %, 0.7 wt. %, 0.8 wt. %, 0.9 wt. %, 1 wt. %, 1.1 wt. %, 1.2 wt. %, 1.3 wt. %, 1.4 wt. %, 1.5 wt. %, 1.6 wt. %, 1.7 wt. %, 1.8 wt. %, 1.9 wt. %, 2 wt. %, 2.1 wt. %, 2.2 wt. %, 2.3 wt. %, 2.4 wt. %, 2.5 wt. %, 2.6 wt. %, 2.7 wt. %, 2.8 wt. %, 2.9 wt. %, 3 wt. %, 4 wt. %, 5 wt. %, 6 wt. %, 7 wt. %, 8 wt. %, 9 wt. % or 10 wt. %, or any range of values therebetween. For example, in some embodiments, the amount of an additive in the electrolyte is or is about in any one of the following ranges: 0.1-10 wt. %, 1-6 wt. %, 2-5 wt. %, 0.1-6 wt. %, 2-8 wt. %, 2-3 wt. %, or 1-4 wt. %.

In some embodiments, an energy storage device is created such that one electrode (e.g., anode) is larger than and overhangs the other electrode (e.g., cathode). One electrode may overhang the other in the winding direction and/or non-winding direction of the electrode assembly. Such electrode overhangs may avoid yield losses. In some embodiments where there is no, or is substantially no, overlap and/or intermingling of the separator and the shaped electrode film (e.g., cathode electrode film), the boundary of the shaped electrode film is easier to identify and therefore improves the ability to form a counter electrode (e.g., anode electrode) with an overhang.

EXAMPLE

Figure 5:
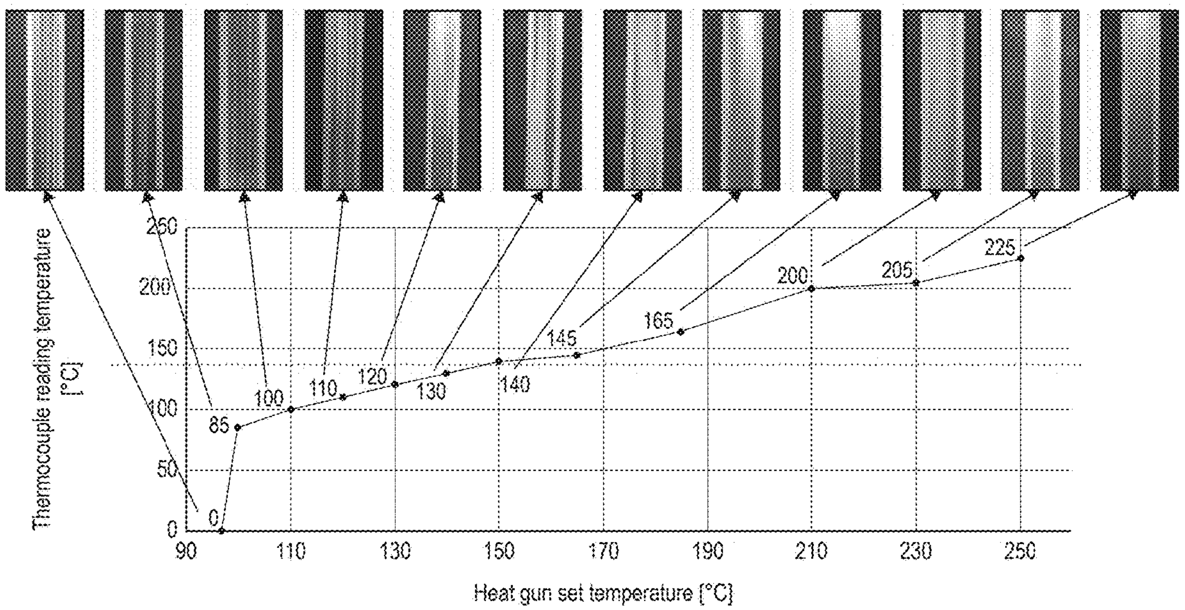
FIG. 5 is a line chart showing creasing in electrodes, according to some embodiments.

FIG. 5 illustrates the creasing in a calendered bare foil region with a system for pre-heating an electrode film as described herein set at a variety of temperatures. The testing procedure includes reading the ambient temperature of bare foil regions prior to entering a calendering nip, then recording an image of the calendered bare foil region after the bare foil region exits the calendering nip. Advantageously, this chart demonstrates that the heater system can control the ambient temperature of the electrode foil before the bare foil region enters the calendering nip. As illustrated, as the temperature of the heater increases, the bare lanes and laminated (e.g., non-bare) regions of a multilane electrode exhibit less creasing. Advantageously, the chart demonstrates that when the electrode foil is heated to certain temperatures, creasing and wood grain pattern can be eliminated. The chart can also demonstrate that creasing and wood grain pattern can be reintroduced to the bare foil region if the heater system is turned off. This can suggest that the temperature of the bare foil region entering the calendering nip can thermally effect the creasing and wood grain pattern in the bare foil region and the laminated (e.g., non-bare) regions.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed battery system. It is to be understood that the forms of disclosure herein shown and described are to be taken as representative embodiments. Equivalent elements, or materials may be substituted for those representatively illustrated and described herein. Moreover, certain features of the disclosure may be utilized independently of the use of other features, all of which is apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense and should in no way be construed as limiting of the present disclosure. All joinder references (e.g., connected, associated, coupled, and the like) are only used to aid the reader's understanding of the present disclosure, and may not create limitations, particularly as to the position, orientation, or use of the elements disclosed herein. Therefore, joinder references, if any, are to be construed broadly. Moreover, such joinder references may not necessarily infer that two elements are directly connected to each other.

Additionally, all numerical terms, such as, but not limited to, "first", "second", "one", "another", or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed in certain cases, as is useful in accordance with a particular application.

For expository purposes, the term "horizontal" as used herein is defined as a plane parallel to the plane or surface of the floor of the area in which the device being described is used or the method being described is performed, regardless of its orientation. The term "floor" can be interchanged with the term "ground." The term "vertical" refers to a direction perpendicular to the horizontal as just defined. Terms such as "above," "below," "bottom," "top," "side,"

"front," "rear," "lateral," "higher," "lower," "upper," "over," and "under," are defined with respect to the horizontal plane, in use.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Although certain embodiments and examples have been described herein, it will be understood by those skilled in the art that many aspects of the systems shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

The ranges disclosed herein also encompass any and all overlap, sub-ranges, and combinations thereof. Language such as "up to," "at least," "greater than," "less than," "between," and the like includes the number recited.

What is claimed is:

1. A system for pre-heating an electrode foil, comprising:

a chimney formed between an inner surface of a first wall and an inner surface of a second wall, the chimney comprising a foil inlet at a first end between the first wall and the second wall, and a foil outlet between the first wall and the second wall and at a second end adjacent to a nip comprising a first calendering roller and a second calendering roller of a heated calender roll device, the chimney configured such that the electrode foil can pass through the foil inlet and out the foil outlet; and a heating device configured to heat the electrode foil adjacent to the foil outlet to a temperature proximate the temperature of the first and second calendering rollers, wherein the heating device comprises:

a gas inlet;

a heater configured to heat gas from the gas inlet; and a nozzle adjacent to the foil outlet and in fluid communication with the heater, the nozzle comprising a bend configured to direct a flow of gas to the inner surface of the heated wall and towards the foil inlet;

wherein the heating device is positioned such that the electrode foil passes from the foil outlet into the nip to create a strain-balanced foil.

2. A system for pre-heating an electrode foil, comprising:

a chimney comprising a first wall, a second wall, a foil inlet at a first end between the first wall and the second wall, and a foil outlet at a second end between the first wall and the second wall; and a heating device adjacent to an outer surface of the first wall, wherein the heating device comprises:

a gas inlet;

a heater in fluid communication with the gas inlet; and a nozzle in fluid communication with the heater and the chimney, wherein the nozzle is adjacent to the foil outlet and is shaped to direct flow towards the foil inlet.

3. The system of claim 2, wherein the chimney is formed between an inner surface of the first wall and an inner surface of the second wall.

4. The system of claim 2, wherein the heating device further comprises a temperature sensor positioned in the nozzle.

5. The system of claim 2, wherein the heating device further comprises a flow guide between the heater and the nozzle.

6. The system of claim 2, wherein the foil inlet is positioned above the foil outlet.

7. The system of claim 2, wherein the nozzle comprises a bend configured to direct the flow of fluid towards the foil inlet.

8. The system of claim 7, wherein the bend directs the flow from a downward direction to an upward direction.

9. The system of claim 2, wherein an angle between the first wall and the second wall is between about 0 and about 5 degrees.

10. The system of claim 9, wherein at least one of the first wall and the second wall are configured to pivot such that the angle is adjustable.

11. The system of claim 2, further comprising a calender roll device comprising a pair of calendering rollers forming a calendering nip, wherein the nozzle is positioned adjacent to the calendering nip.

12. The system of claim 11, wherein the nozzle is positioned above the calendering nip and the nozzle is configured to direct flow away from the calendering nip.

13. The system of claim 11, wherein an end of the nozzle is positioned a distance less than 200 mm from the calendering nip.

14. The system of claim 12, further comprising a first side seal positioned at a first edge of the nozzle and a second side seal positioned at a second edge of the nozzle, wherein the first side seal and the second side seal are orthogonal to the first wall and the second wall.

15. The system of claim 11, wherein each calendering roller of the pair of calendering rollers comprise a heated surface.

* * * * *